United States Patent [19]

Leon et al.

[11] Patent Number: 5,775,861
[45] Date of Patent: Jul. 7, 1998

[54] AUTOMATIC FASTENING OR CLOSING DEVICE OPERATING BY PASSING THROUGH A DEAD POINT

[75] Inventors: Jean-Pierre Leon, Houilles; Philippe Vigoroux, Conflans Sainte Honorine, both of France

[73] Assignee: Rapid S.A., Paris, France

[21] Appl. No.: 768,595

[22] Filed: Dec. 18, 1996

[30] Foreign Application Priority Data

Dec. 19, 1995 [FR] France .................. 95 15080

[51] Int. Cl.⁶ .................. F16B 21/00; E04F 19/02
[52] U.S. Cl. .................. 411/344; 411/340; 411/908; 24/297
[58] Field of Search .................. 411/37, 38, 340, 411/344, 345, 908; 24/297

[56] References Cited

U.S. PATENT DOCUMENTS 3,651,734  3/1972  McSherry .
4,850,773  7/1989  Asami ..................... 24/297 X
4,993,901  2/1991  McSherry et al. .......... 411/340
5,195,856  3/1993  McSherry et al. .......... 411/340 X

FOREIGN PATENT DOCUMENTS

A 35 17 620  11/1985  Germany .
2 168 419   6/1986   United Kingdom .

*Primary Examiner*—Neill R. Wilson
*Attorney, Agent, or Firm*—Pennie & Edmonds LLP

[57] ABSTRACT

An automatic fastening or closing device operating by moving past a dead point and comprising a base portion to which are pivotally connected arcuate tongues themselves pivotally connected by hinges to lugs and comprising each one an outwards projecting portion to form a bearing point allowing the lugs to assume a position remote from each other, i.e. an open locking position, the device being applicable to the fastening and to the locking in blind relationship of a box-like or channel-shaped part onto any support or member whatsoever.

12 Claims, 4 Drawing Sheets

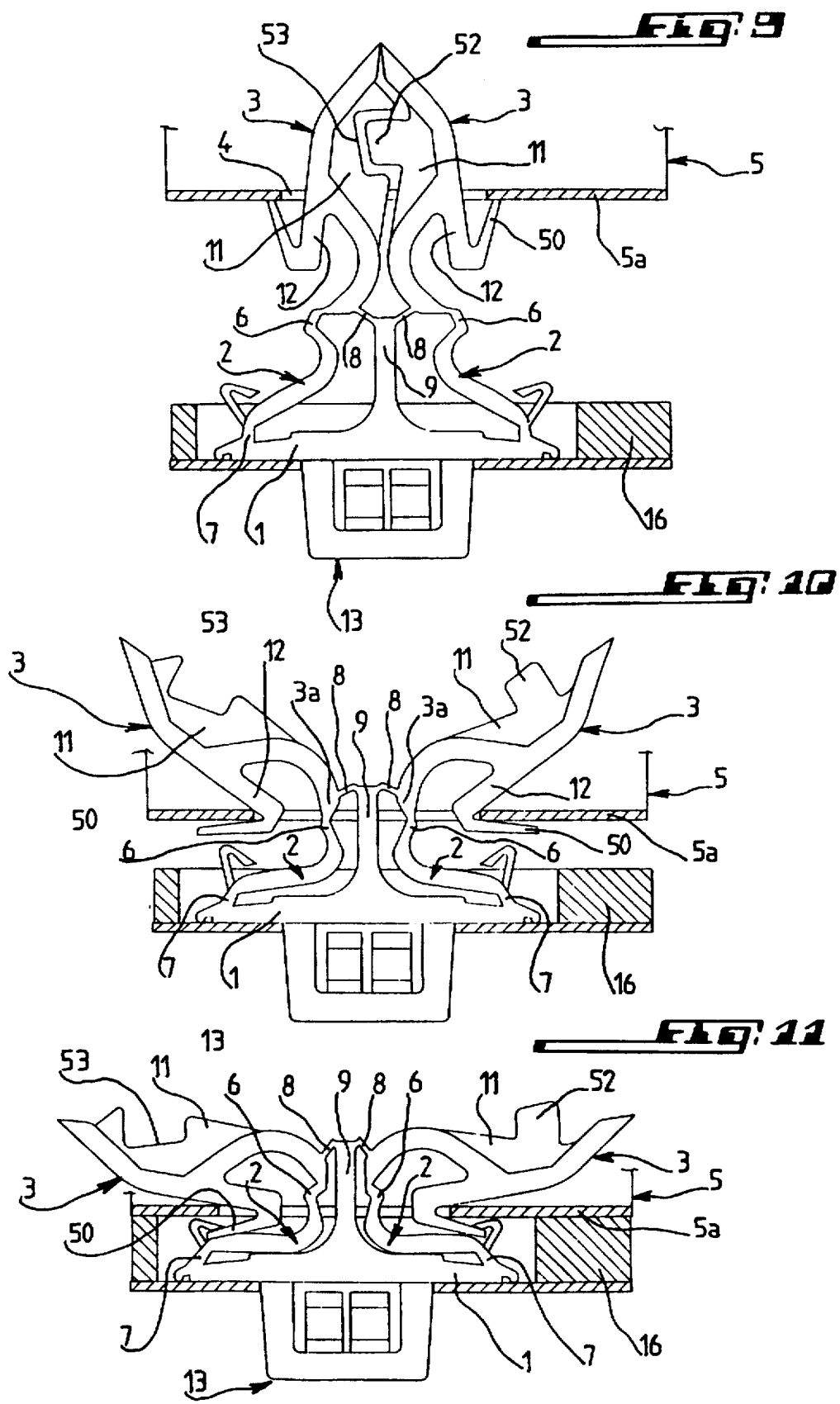

AUTOMATIC FASTENING OR CLOSING DEVICE OPERATING BY PASSING THROUGH A DEAD POINT

TECHNICAL FIELD

The present invention relates essentially to an automatic fastening or closing device operating by passing through a dead or null point.

There are already known fastening devices forming one single part consisting of a base portion to which are pivotally connected two opposite fastening lugs.

The lugs under the effect of a pressure may assume a position near or remote from each other with a passage through a dead or null point between these two positions. The term dead or null point refers to the point of equilibrium beyond which the natural resting position of the lugs changes from being in relative proximity to one another to being remotely located from each other.

This kind of device is generally used for fastening onto a support electric cables or wires which were in a way enclosed between both lugs drawn near each other under the effect of a pressure exerted upon the base portion, it being understood that the said base portion was fastened onto the said support.

SUMMARY OF THE INVENTION

The present invention relates to a device of the kind referred to hereinabove but which has a particular structure such that it permits an instantaneous locking in a blind manner of a more or less closed part such for example as a casing onto a support.

For that purpose the subject of the invention is an automatic fastening or closing device forming one single part consisting of a base portion onto which are pivotally connected at least two opposite fastening lugs which under the effect of a pressure may assume a position near or remote from each other with a passage through a dead or null point between these two positions, characterized in that each lug is connected by a first hinge to an arcuate tongue itself pivotally connected onto the base portion and by a second hinge to an element made fast to the base portion.

According to another characterizing feature of this device, the aforesaid first and second hinges connect one end of each lug to one end of an arcuate tongue and to one end of the aforesaid element, respectively, which projects from the base portion and extends between both arcuate tongues.

This device is further characterized in that the aforesaid end of the arcuate tongues comprises a portion projecting outwards of the device to form a bearing point allowing the lugs to assume an open locking position wherein they are remote from each other.

It should further be specified here that the aforesaid arcuate tongues exhibit a concavity facing the outside of the device.

The latter is further characterized in that the aforesaid first and second hinges are originating from the aforesaid end of both lugs on either face, respectively, of each one of the lugs.

According to still another characterizing feature of this device, each lug exhibits substantially the shape of an S the upper arcuate portion of which is provided inside with a rib and is extended outwards by at least one guide finger extending in confronting relationship with the lower arcuate portion of the S.

It should be specified here that the rib of one lug may comprise a nose co-operating with a notch formed in the rib of the other lug.

According to another embodiment, each lug is extended outwards by a guide finger comprising at its end a hook-shaped turned-up portion forming a bearing point allowing the said lugs to assume an open locking position.

In this case the aforesaid arcuate tongues may comprise each one at the level of the pivotal connection onto the base portion, a hook or the like adapted to cooperate with the aforesaid hook-shaped turned-up portion for locking the lugs in the open position.

According to still another characterizing feature, the base portion comprises on its side opposite to that carrying the arcuate tongues, the lugs and the aforesaid elements, a snug means with clipping tongues.

According to another characterizing feature of this invention, the base portion has in the free state a preferably arcuate shape.

According to still another characterizing feature, the aforesaid base portion is adjacent to at least one tightness skirt facing one end or the other one of the device.

Thus the device may on the one hand be fastened in a fluid-tight relationship through clipping onto a support and on the other hand be fastened by the aforesaid lugs in a blind fashion onto a member in the shape of a box, casing or the like.

This being so, the snug means together with the clipping tongues could be omitted so that the base portion will quite simply form a closure member for the aperture of the part into which will be mounted in a blind fashion the device according to this invention.

BRIEF DESCRIPTION OF THE DRAWINGS

The invention will be better understood and further objects, characterizing features, details and advantages thereof will appear more clearly as the following explanatory description proceeds with reference to the accompanying drawings given by way of non limiting examples only illustrating several presently preferred specific embodiments of the invention and in which :

FIG. 2 is an elevational view in axial section through this device in a position clipped onto a support and in a position at the beginning of insertion of the lugs into a part forming a casing or the like;

FIGS. 9, 10 and 11 illustrate in elevation three successive steps for mounting the device shown on FIG. 6 into the aperture of a wall viewed in section and belonging to any part whatsoever such for example as a casing.

DETAILED DESCRIPTION OF THE PREFERRED EMBODIMENTS

Figure 1:
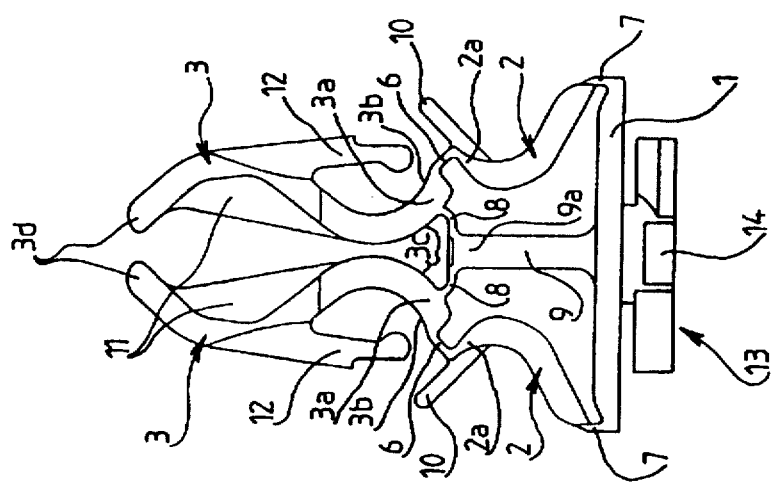
FIG. 1 is an elevational side view of a device according to this invention in the rest position.
Figure 4:
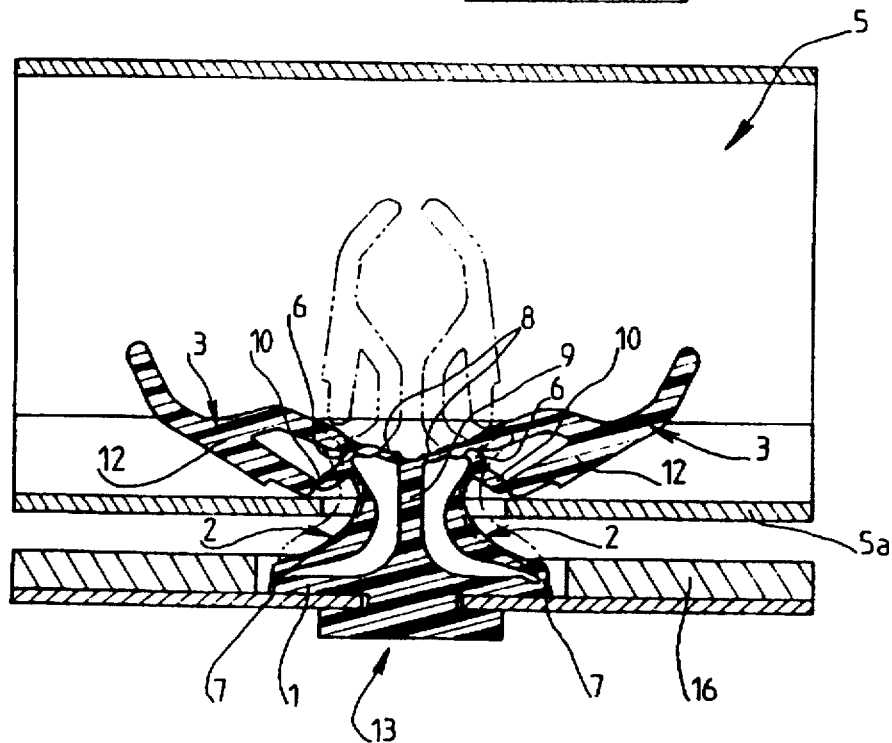
FIG. 4 is a view similar to FIGS. 2 and 3 but showing the device after a pressure has been exerted upon the casing to thus cause a motion of both lugs away from each other.
Figure 5:
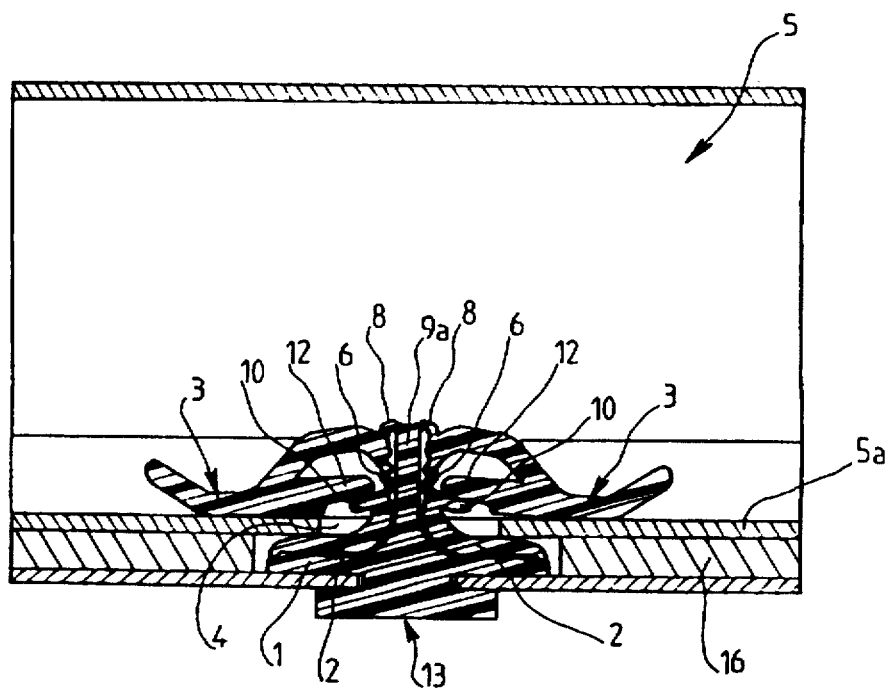
FIG. 5 is a view similar to FIG. 4 but showing the support and the casing in the assembled position after the lugs have moved past the dead point position to thus bear upon one wall of the casing which is therefore made fast to the support.
Figure 6:
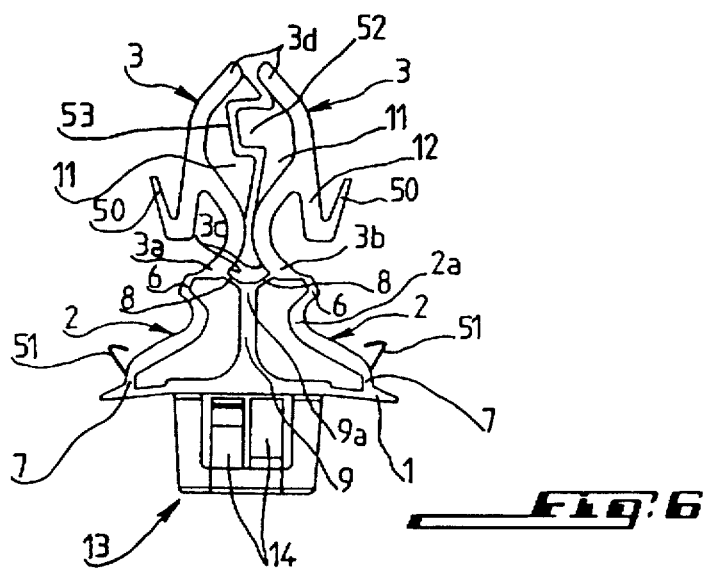
FIG. 6 is a view similar to FIG. 1 but showing another embodiment of the device according to this invention.

Referring more particularly to FIGS. 1 and 6, it is seen that a device according to this invention forms one single piece for example made from molded plastics material, this single piece essentially comprising a base portion 1 on one side of which are provided two arcuate tongues 2 in confronting relationship with each other and with their concavities facing outwards and two lugs 3 also in confronting relationship with each other and exhibiting each one an agee-shaped profile so that they may be easily inserted into an aperture 4 of a part 5 visible in FIGS. 2 to 5 and 9 to 11 and exhibiting for example more or less the shape of a closed casing or envelope.

Reverting to FIGS. 1 and 6 there is seen that each lug 3 is connected by a first hinge 6 to an arcuate tongue 2 which is itself connected to the base portion 1 by a pivotal connection 7.

Each lug 3 is further connected by a second hinge 8 to a web-shaped element 9 which is made fast to the base portion 1 and extends between both arcuate tongues 2.

More specifically the first hinge 6 and the second hinge 8 connect one lower portion 3a of each lug 3 to an upper end 2a of an arcuate tongue 2 and to the free end 9a of the web-shaped element 9, respectively, which extends between the arcuate tongues 2.

It should be pointed out here that the hinges 6 and 8 as well as the pivotal connections 7 are quite simply formed of a thinned portion made from plastics material as this is known per se in the art.

As seen in FIGS. 1 to 5, the upper end 2a of the arcuate tongues 2 comprises an outward projecting portion 10 to form as this will be described subsequently in respect of the operation, a bearing point allowing the lugs 3 to assume an open locking position remote from each other.

Reverting to both hinges 6, 8 associated with the lower end 3a of each lug 3, it is seen that the first hinge 6 originates from the outside face 3b of each lug 3 whereas the second hinge 8 originates from the inside face 3c of each lug 3.

As previously stated, each lug 3 exhibits a generally ogival shape, i.e. more specifically the shape of an S.

The upper arcuate portion of the S, forming a free end 3d of each lug 3 is provided inside with a rib 11. This arcuate upper portion is extended in a way outwards by a guide finger 12 which extends in confronting relationship with the lower arcuate portion of the S. The finger 12 of the lugs 3 will therefore perform a guiding function on the insertion of the lugs 3 into the aperture 4 of the envelope or box-shaped member 5 as described subsequently.

A snug means 13 with clipping tongues 14 is integrally made through molding in one piece with the base portion 1 on the other side of the base portion, i.e. on the side opposite to the one carrying the arcuate tongues 2, the web-like element 9 and the lugs 3.

This snug means may be omitted without departing from the scope of the invention so that the base portion 1 will then perform the function of a simple closure member.

For a better understanding of the invention, the operation of the device shown in FIG. 1 will be hereinafter described in detail when referring successively to FIGS. 2 to 5.

Figure 2:
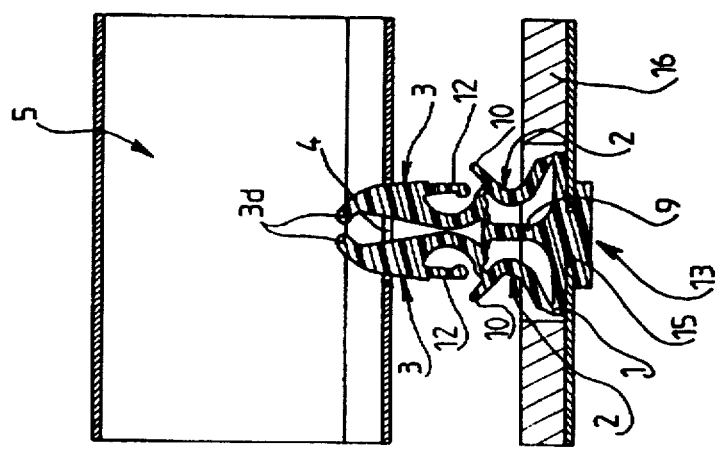

Referring first to FIG. 2 there is seen that the device according to this invention is mounted through clipping owing to the snug means 13 into an aperture 15 of a support 16. The free end 3d of the lugs 3 is then inserted into the aperture 4 formed in the more or less closed casing-shaped or envelope-like part 5 and forming a duct for instance.

Figure 3:
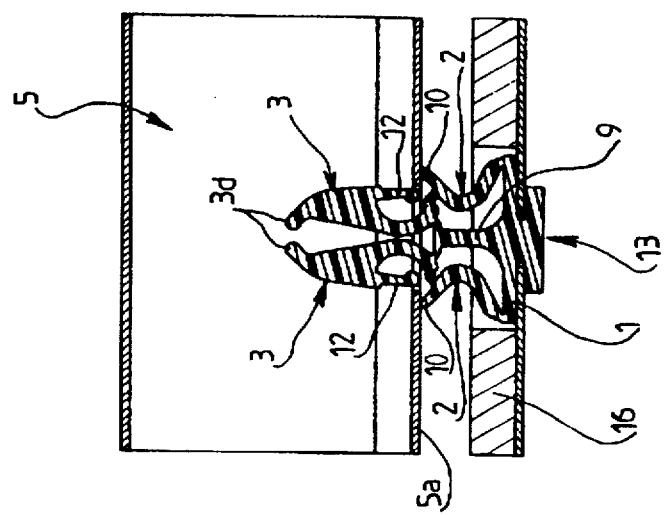
FIG. 3 is a view similar to FIG. 2 but showing the lugs of the device in a position fully inserted into the casing.

Then as seen in FIG. 3 by moving the support 16 and the part 5 towards each other, the lugs 3 fully enter the inside of the part 5 while being guided by the finger 12 associated with each lug 3. At this stage, the lugs 3 remain substantially vertical and immovable with respect to each other. It should be pointed out here that the part 5 rests with a wall 5a upon the projecting portions 10 belonging to both arcuate tongues 2, respectively.

As shown in figure 4, by continuing to move the part 5 and the support 16 through pressure towards each other the wall 5a of the part 5 is bearing upon the projecting portions 10 which pushes back on the arcuate tongues 2 and causes the lugs 3 to move away from each other to a dead point position beyond which the lugs 3 will automatically assume the position visible in FIG. 5, i.e. a fully open or locking position of the part 5 on the support 16.

It should be specified here that the passage through the dead or null point is provided by the particular combination and geometry of the following elements : lower end 3a of the lugs 3, hinges 6, 7 and 8 and upper end 2a of the arcuate tongues 2. Once the spacing between the lugs 3 is increased past a certain point referred to as the dead or null point, the combination and geometry of said elements cause the lugs 3 to have a tendency to naturally open.

In the position visible in FIG. 5, the lowered lugs 3 will advantageously exert a pressure upon the wall 5a of the part 5 which will thus be made well fast to the support 16. This means that if for example electric cables or wires extend into the part 5 which will then have in this case the shape of a channel, these cables will form a bundle which will be firmly retained on the support 16 which may be any member whatsoever.

As explained hereinabove, the clipping snug means 13 may be omitted although this has not been shown.

In this case, the base portion will form a closure member or plug. This means that there will be no fastening of the device onto a support such as 16 but that this device will quite simply be inserted into an aperture such as 4 belonging to a part such as 5 for quite simply closing the said aperture 4 as this is understandable when again referring to FIG. 5 on which the support 16 and the snug means 13 would have been omitted.

Figure 7:
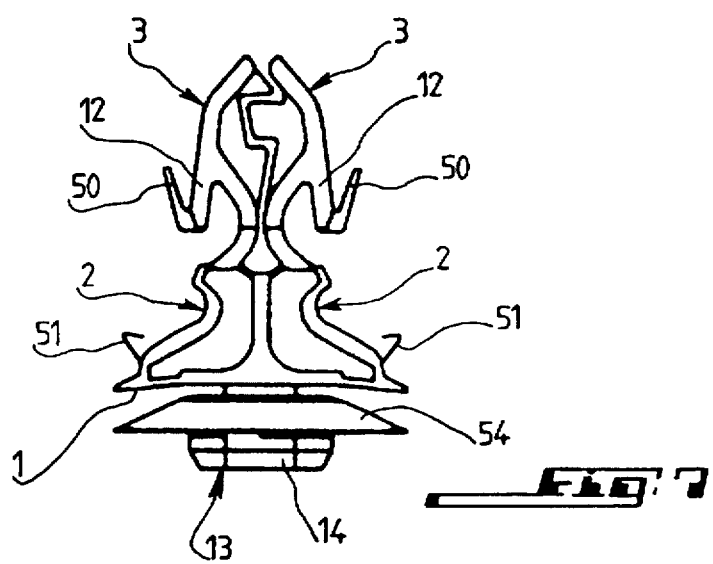
FIGS. 7 and 8 are view similar to FIG. 6 but showing the device fitted with a tightness skirt adjacent to the base portion, this skirt facing either one of the ends of the device.
Figure 8:
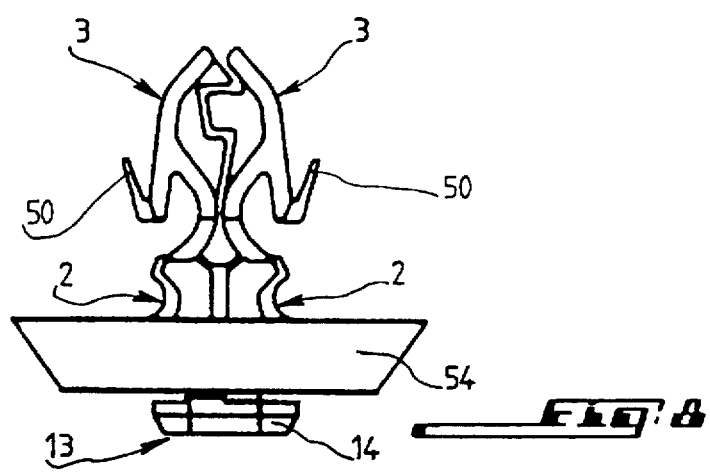

It should now be referred to FIGS. 6 to 8 illustrating another embodiment of the invention wherein the same reference numerals as those of FIGS. 1–4 have been used to designate the common elements.

Here the guide finger 12 of the lugs 3 comprises at its free end one hook-shaped or turned-up portion 50 which forms a bearing point for the lugs 3 during the insertion into the aperture 4 of the part 5 as explained in detail subsequently.

As further seen in FIG. 6, the arcuate tongues 2 although this is not compulsory may comprise at their pivotal connection 7 onto the base portion 1, a hook or the like 51 which extends outwards. Such a hook 51 may co-operate with the hook-like turned-up portion 50 once the device has been fully inserted into the aperture 4, thereby having caused as previously explained the full opening of the lugs 3 and the folding back of the hook-shaped turned-up portions 50 towards the hooks 51.

As previously explained, there is further seen in FIG. 6 each lug 3 comprises at its upper portion a rib 11, one of these ribs here comprising a nose 52 which co-operates with a notch 53 formed in the rib of the other lug. The notch 53 and the nose 52 could also be provided in the embodiment of FIG. 1. Such a system allows a positive co-operation of the lugs 3 during their insertion into the aperture 4 of the part 5 so that a relative displacement or an excessive curvature of the lugs 3 during their insertion into the aperture 4 of the part 5 will thus be avoided.

In FIGS. 6, 7 and 8 it is seen that the base portion 1 here exhibits an arcuate shape, i.e. slightly concave towards the clipping snug means 13. Thus when the clipping snug means 13 will be mounted into the aperture 15 of the support 16 as seen in FIGS. 9 to 11, the deformation and the flattening of the base portion 1 will advantageously cause the lugs 3 to be moved towards each other thereby facilitating the insertion of these lugs into the aperture 4 of the part 5. Such an arcuate base portion 1 may of course be provided in the embodiment visible on FIG. 1.

FIGS 7 and 8 show a flexible skirt 54 made fast to the clipping snug means 13 and adjacent to the base portion 1. This yielding skirt 54 may be turned either towards the snug means 13 (FIG. 7) or towards the base portion 1 (FIG. 8) and it will advantageously participate in the fluid-tightness of the assembly at the level either of the aperture 15 of the support 16 or at the level of the aperture 4 of the part 5.

Such a tightness skirt 54 could of course be provided in the embodiment previously described and illustrated by FIG. 1.

The operation of the embodiment of FIG. 6 which has just been described, will now be briefly explained while referring to FIGS. 9 to 11.

As seen in FIG. 9, the lugs 3 are inserted into the aperture 4 of the wall 5a belonging to the part 5 until said wall 5a is bearing upon the hook-shaped or turned-up portions 50.

By continuing to insert the lugs 3, the pressure the wall 5a exerts on hooks 50 causes the lugs 3 to move away from each other until the hooks 50 assume the substantially horizontal position visible in FIG. 10.

At this stage, it is important to point out that the edges of the aperture 4 are providing a tong effect upon the lower end 3a of the lugs 3 which at this level are moving somewhat towards each other so that by continuing the insertion into the aperture 4 and by moving past the dead point, the lugs 3 will suddenly be moved away from each other with a certain force until they are in the fully open position upon the wall 5a as seen in FIG. 11. It should be pointed out here that the lugs 3 at this stage will exert a clamping effect upon the wall 5a of the part 5.

Moreover as seen in FIG. 11, the hooks 50 are folded back towards the base portion 1 and co-operate with the hooks 51 so as to provide a positive locking of the whole assembly which in addition to the aforesaid clamping may thus provide a perfect firm connection between the support 16 and the part 5.

There has thus been provided according to the invention an automatic fastening or closing device operating by passing through a dead point to allow at least two lugs to carry out the assembly in blind relationship of two parts by moving the lugs away from each other, this device advantageously forming one single piece preferably moulded from plastics material which is not very expensive and exhibits a remarkably reliable operation.

The invention is of course not at all limited to the embodiments described and illustrated which have been given by way of examples only.

Thus the snug means 13 together with its clipping tongues 14 may assume any suitable shape whatsoever for the mounting through clipping or also through rotation as well as the holes in the pieces to be assembled may be of any shape whatsoever. Likewise the processes of mounting and disassembling the device of the invention may be of any kind and are depending on the parts to be assembled.

This means that the invention comprises all the technical equivalents of the means described as well as their combinations if the latter are carried out according to its gist and within the scope of the appended claims.

What is claimed is:

1. In an automatic fastening or closing device formed from a single piece of material having a base portion and at least two opposite fastening lugs which under the effect of pressure assume a position near or remote from each other upon moving past a dead point between the two positions, the improvement comprising:

first and second arcuate tongues, each pivotally connected to the base portion;

first means for connecting a lower end of a first lug to an upper end of the first tongue;

second means for connecting a lower end of a second lug to an upper end of the second tongue;

a post member attached to the base portion extending towards the lugs and positioned between the lugs;

third means for connecting the lower end of the first lug to an upper end of the post member; and fourth means for connecting the lower end of the second lug to the upper end of the post member whereby movement of the lugs toward each other to a closed unlocked position enables insertion of the lugs into an aperture, whereupon, after passing therethrough, the lugs move away from each other to an open locking position.

2. The device according to claim 1, wherein the upper end of each arcuate tongue includes an outward projecting portion forming a bearing point for utilizing pressure to cause the lugs to move away from each other from the closed unlocked position to the open locking position, said pressure resulting from contact between the bearing point and a wall which contains the aperture, said contact resulting from inserting the lugs into the aperture.

3. The device of claim 1, wherein said arcuate tongues exhibit a concavity facing away from the post member.

4. The device of claim 1, wherein the first connecting means originates at a first face of the lower end of the first lug, the second connecting means originates at a first face of the lower end of the second lug, the third connecting means originates at a second face of the lower end of the first lug, and the fourth connecting means originates at a second face of the lower end of the second lug.

5. The device of claim 4, wherein each connecting means comprises a hinge.

6. The device according to claim 1, wherein each lug exhibits substantially the shape of an S, an upper arcuate portion of which is provided with a reinforcing rib and is extended externally by at least one guide finger extending in confronting relationship with a lower arcuate portion of the S shape.

7. The device according to claim 6, wherein the reinforcing rib of the first lug comprises a nose co-operating with a notch formed in the reinforcing rib of the second lug.

8. The device according to claim 1, wherein each lug is extended externally by a guide finger comprising at an end a hook-shaped portion forming a bearing point which facilitates the open locking position.

9. The device according to claim 8, wherein each arcuate tongue further comprises a hook located adjacent the pivotal connection onto the base portion and co-operating with said hook-shaped portion to secure the lugs in the open locking position.

10. The device according to claim 1, wherein the base portion comprises a snug means with clipping tongues for engaging a cover member.

11. The device according to claim 1, wherein the base portion has an arcuate shape when the lugs are in the closed unlocked position.

12. The device according to claim 11, wherein said base portion is adjacent to at least one tightness skirt providing a fluid-tight connection between the device and the wall.

* * * * *

UNITED STATES PATENT AND TRADEMARK OFFICE
CERTIFICATE OF CORRECTION

PATENT NO. : 5,775,861

DATED : July 7, 1998

INVENTOR(S) : LEON et al.

It is certified that error appears in the above-identified patent and that said Letters Patent is hereby corrected as shown below:

On title page,
At [75] Inventors: change "Philippe Vigoroux" to --Philippe Vigouroux--.

Column 3, line 12: change "agee-shaped" to --ogee-shaped--.

Signed and Sealed this

Eighth Day of September, 1998

Attest:

BRUCE LEHMAN

*Attesting Officer*    *Commissioner of Patents and Trademarks*